2 Sheets—Sheet 1.
B. CHAMBERLAIN.
MAIL POUCH DELIVERY DEVICE.
No. 11,649. Reissued Feb. 8, 1898.
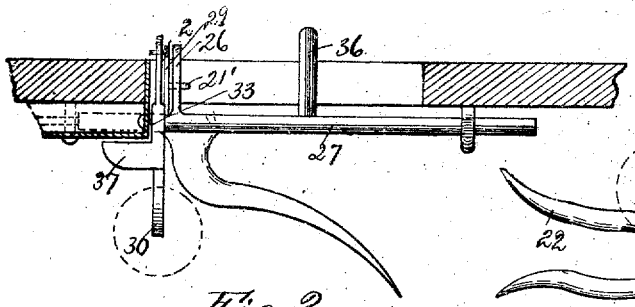
Fig. 1.
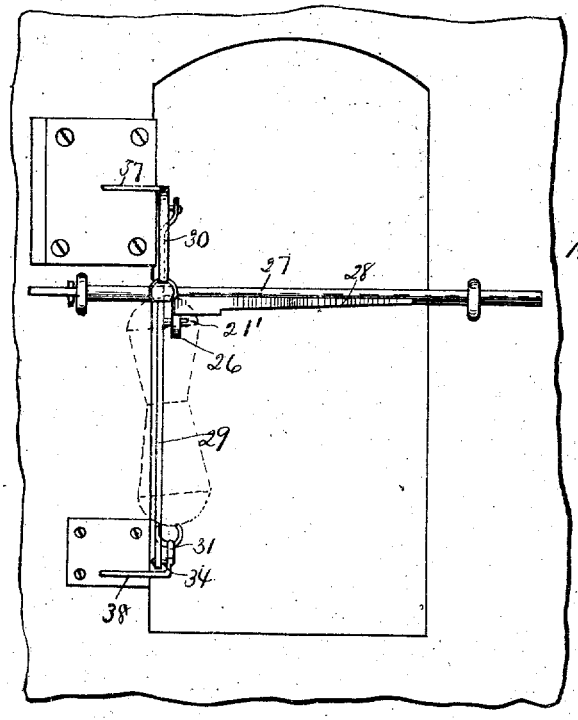
Fig. 2.
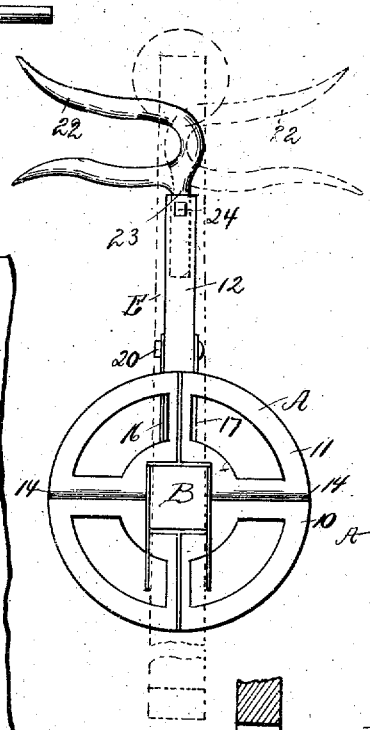
Fig. 4.
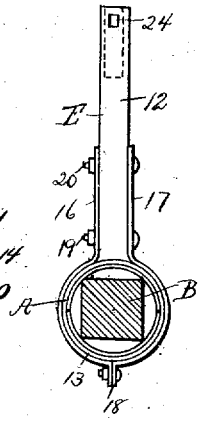
Fig. 3
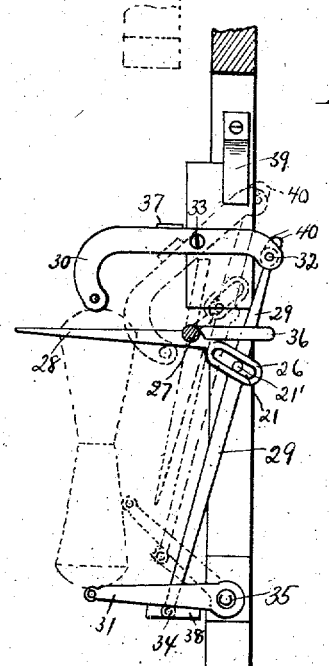
Witnesses
Albert Popkins.
H. Joseph Doyle
Inventor
Blanchard Chamberlain
By. "
Attorney
THE ECKERT LITHOGRAPHING CO., WASHINGTON, D. C.

2 Sheets—Sheet 2.

B. CHAMBERLAIN.

MAIL POUCH DELIVERY DEVICE.

No. 11,649. Reissued Feb. 8, 1898.

Witnesses.
Albert Popkins.
H. Joseph Doyle.

Inventor
Blanchard Chamberlain.
By. F. M. Wale
Attorney

THE ECKERT LITHOGRAPHING CO., WASHINGTON, D. C.

UNITED STATES PATENT OFFICE.

BLANCHARD CHAMBERLAIN, OF BELLEFONTAINE, OHIO.

MAIL-POUCH-DELIVERY DEVICE.

SPECIFICATION forming part of Reissued Letters Patent No. 11,649, dated February 8, 1898.

Original No. 594,983, dated December 7, 1897. Application for reissue filed December 20, 1897. Serial No. 662,768.

*To all whom it may concern:*

Be it known that I, BLANCHARD CHAMBERLAIN, a citizen of the United States, residing at Bellefontaine, in the county of Logan and State of Ohio, have invented certain new and useful Improvements in Mail-Pouch-Delivery Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide for the delivery of mail-pouches from moving railway-cars, and I attain my object by the mechanical means hereinafter described and claimed.

Figure 5:
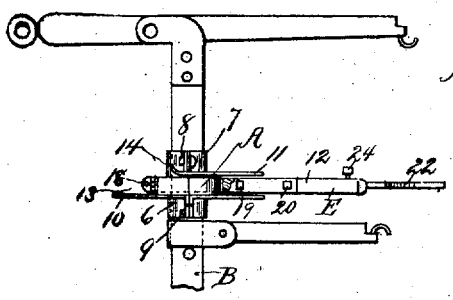
Figure 6:
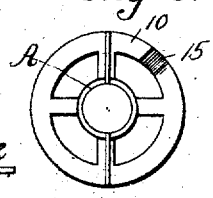
Figure 7:
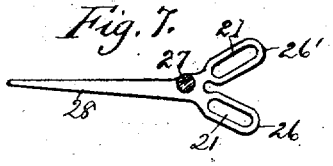
Figure 8:
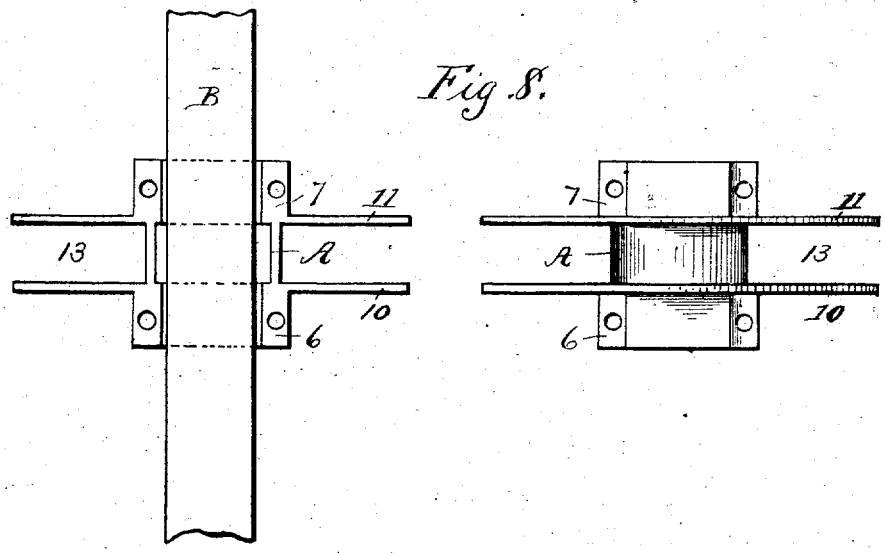

In the drawings, Figure 1 is a plan view of my device, a portion of the side of the car being in section. Fig. 2 is a front elevation of my mail-pouch-holding device attached to the car. Fig. 3 is a side elevation of the same. Fig. 4 is a detail of the ground catcher. Fig. 5 is a detail of the receiving device attached to a standard. Fig. 6 is a detail of the lower disk. Fig. 7 is a modification of the short arm or slotted lever. Fig. 8 is a view of the parts of the collar separated, but ready to be bolted together upon the standard, one part being shown upon the standard.

Like characters of reference indicate the same parts in the views.

In my device I provide a third arm wholly independent of the pouch-supporting arms now in common use, which is adapted to carry a hook to catch the mail-pouches and to freely rotate around the standard upon which the indicated arm is supported.

The collar A, upon which the ground catcher E is mounted, is made in two parts 6 and 7, (shown best in Figs. 5 and 8,) which are fastened together by the bolts 8 and 9 on one side of the standard, as shown in the drawings, Fig. 5, and similarly fastened on the opposing side of the standard to clamp the collar at any desired point upon the standard B, which rests upon the earth and is now in common use to support a well-known device to hold mail-pouches to be caught from moving railway-cars. The collar A is provided with an annular way 13, which is defined in its vertical extension by the flanges 10 and 11. The lower flange 10 is annular and is a rest for the ground catcher-arm 12 at every point radial of the standard B. The upper flange 11, not essentially extending all the way around the standard B, prevents an upward throw of the ground catcher-arm 12 at the moment of its contact with the mail-pouch. By giving the terminal edge of the upper flange 11 a slight upward turn at 14 the annular way 13 is made open-mouthed to insure certainty in the ground catcher-arm 12 following the annular way 13 in its revolution upon the collar A.

To prevent the ground catcher-arm 12 from being swung out of a desired position for the reception of a mail-pouch by accident, I provide the depression 15 in the lower flange 10. (Shown best in Fig. 6.) It is plain that the ground catcher-arm will fall into the depression 15 and will tend to remain therein until forced past the depression by the impact of the received mail-pouches. The ground catcher E is held to turn upon the annular way 13 by the straps 16 and 17, which are bolted together at 18 and rigidly fastened to the ground catcher-arm 12 in any proper manner, as preferably by the bolts 19 and 20, as shown best in Fig. 4. The ground catcher-hook 22 is supplied for the reception of a mail-pouch and is reversible in the hollow end of the ground catcher-arm 12 by means of the shank 23 (shown in Fig. 1 in dotted lines) and removable pin 24, which passes through the hollow end of the ground catcher-arm 12 to hold the shank in place. It is plain that by removing the pin 24 the ground catcher-hook 22 may be reversed for use in a direction opposite to that shown in the drawings by positive lines, as shown in dotted lines.

If desired, the collar A may be more rigidly fastened to the standard B than by the clamping means herein described by passing one or more bolts through the collar and the standard or in any other manner well known to those skilled in the art of attaching collars to supporting-standards.

For the purpose of having mail-pouches in a position on a railway-car to be automatically delivered to the ground catcher-hook 22 I provide the short arm or slotted lever 26 upon the horizontal bar 27, now in common use, to support the receiving-hook 28, which is also in common use. In the short arm or lever 26 I supply the slot 21 for the reception of the pin 21′ upon the link 29. The link 29 connects the upper mail-pouch holder 30 with the lower mail-pouch holder 31, (shown best in Fig. 3,) being attached to the end of the upper mail-pouch holder at 32 on the car side of the pivot-point 33, where the upper mail-pouch holder is attached to a plate which in turn is fastened to the side of the car, and attached to the lower mail-pouch holder at the point 34, which is located outside of the pivot-point 35, where the lower mail-pouch holder is attached to a plate which is also fastened to the side of the car. It is plain that by actuating the horizontal bar 27 by a downward pull upon the handhold 36 the respective mail-pouch holders may be thrown into the position for suspending a mail-pouch, as shown in positive lines in the drawings, Fig. 3, or retired, as shown in dotted lines therein.

The stops 37 and 38, located upon the mail-pouch holders 30 and 31, are to prevent the holders from being separated at their free outer ends beyond a desired distance and operate as lateral braces to the holders.

To provide for reversing the delivery device for its use in receiving mail-pouches from railway-cars moving in a direction opposite to that for which the device is adapted, as described and shown in the drawings, the short arm or slotted lever 26′ is supplied for use in lieu of short arm or slotted lever 26, as shown in detail in Fig. 7.

To provide a means for clamping the mail-pouch holders in a retired position, so that they will be least in the way when not in immediate use, I provide the catch 39, being a plate-spring, to engage the extended upper end 40 of the link 29 by friction. The mail-pouch holders may be attached to the side of the car by any suitable means well known to the art. It is plain that the ground catcher E must be so adjusted in position that in operation the ground catcher-hook 22 will receive within its grasp the mail-pouch suspended upon the mail-pouch holders located upon the side of the car. Being thus adjusted, in operation the mail-pouch will be automatically deposited in the ground catcher-hook 22, whereupon the ground catcher-arm carrying the ground catcher-hook will be started to rotate about the standard B upon the annular way 13 and will come to rest by friction due to gravity.

By utilizing the standard B now commonly used to support the ordinary holder from which mail is taken by trains in motion and such other parts of the catching device upon mail-cars as are now in use I greatly decrease the expense of my device in its adaptation and avoid alteration of the existing construction of mail-cars or the "cranes" now erected and in use upon railways.

My device does not in any manner make use of or interfere with the upper or lower arm constituting the present holders of mail-pouches to be caught by moving trains or with the catching of mail-pouches as now commonly practiced.

Any device whereby the shock of the impact of the mail-pouch in striking the ground catcher-hook would be broken and whereby the ground catcher-arm would be free to rotate or vibrate until it came to rest by gravity may be substituted for my annular way and the ground catcher-arm rotarily attached thereto without departing from my invention, and I therefore do not confine myself to the indicated annular way and rotarily-attached arm.

Having described my invention, I claim—

1. In a mail-pouch-delivery device, a collar supported upon a standard in combination with a catcher-hook socketed in the end of a catcher-arm mediately mounted upon the collar, as and for the purposes set forth.

2. In a mail-pouch-delivery device, a collar supported upon a standard in combination with a catcher-hook reversibly socketed in the end of a catcher-arm mediately mounted upon the collar, as and for the purposes set forth.

3. In a mail-pouch-delivery device in combination a collar having flanges and an annular way supported upon a standard, a catcher-arm rotarily mounted upon the collar and a catcher-hook socketed in the catcher-arm, as and for the purposes set forth.

4. In a mail-pouch-delivery device a catcher-arm mediately supported upon a standard and adapted to freely rotate about and project horizontally from the standard, in combination with the supporting-standard, as and for the purposes set forth.

5. In a mail-pouch-delivery device, an upper and lower mail-pouch holder attached to the car side in combination with a link attached to the holders, a pin upon the link operating in a slot in the end of a slot-lever attached to a bar located upon the side of the car and having a handhold, as and for the purposes set forth.

6. In a mail-pouch-delivery device means for holding a mail-pouch to be delivered by a moving train comprising the upper and under holders attached to the car side, in combination with a catcher-hook for the reception of the mail-pouch socketed in the end of a catcher-bar mediately attached to a collar upon a standard resting upon the earth, as and for the purposes set forth.

In testimony whereof I affix my signature in presence of two witnesses.

BLANCHARD CHAMBERLAIN.

Witnesses:
JAS. C. WONDERS,
WM. L. WRIGHT.